3,504,042
PROCESS FOR PRODUCING 2,2-DIMETHYL-1,3-PROPANEDIOL
Yasuo Shimono, Minoo-shi, and Tokuo Yamaguchi, Kyoto, Japan, assignors to Japan Gas-Chemical Company, Inc., Tokyo, Japan, a corporation of Japan
Continuation-in-part of application Ser. No. 409,606, Nov. 6, 1964. This application Mar. 21, 1968, Ser. No. 714,897
Claims priority, application Japan, Nov. 6, 1963, 38/59,921
Int. Cl. C07c *31/18;* C08g *17/12*
U.S. Cl. 260—635         1 Claim

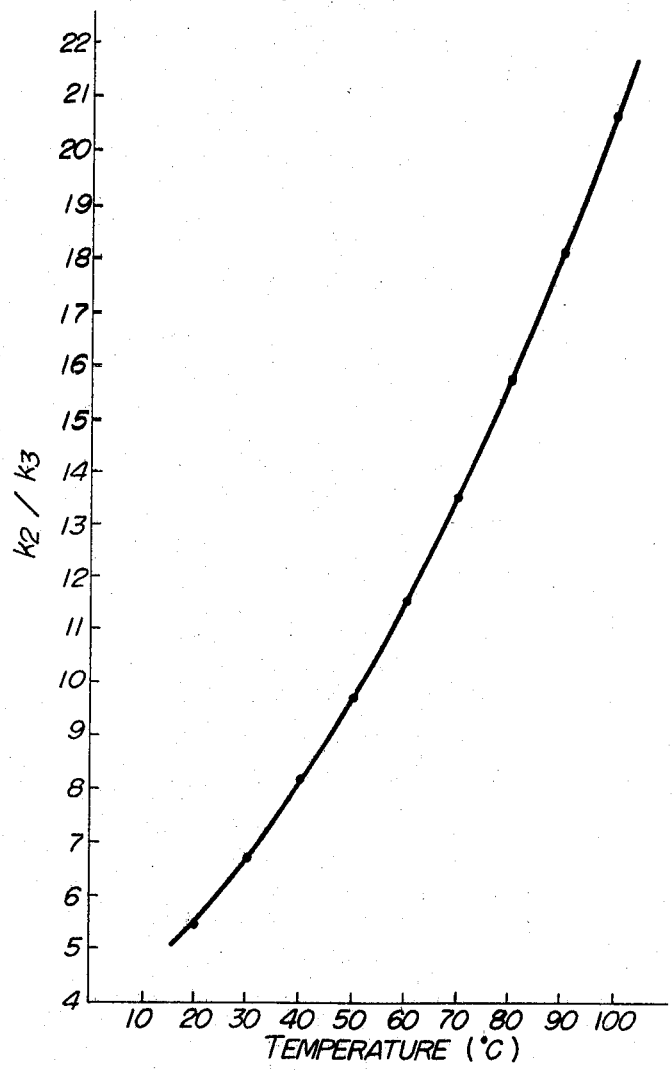

ABSTRACT OF THE DISCLOSURE 2,2,-dimethyl-1,3-propanediol is prepared from isobutyraldehyde and formaldehyde by first selectively effecting the aldol condensation reaction at a temperature of 10° to 50° C. while maintaining the pH of the reaction mixture between 7.0 and 11.5 and then effecting the crossed Cannizzaro reaction between the intermediately produced oxypivalaldehyde (2,2-dimethyl-3-oxypropanol-(1)) and formaldehyde at a temperature higher than 50° C. and lower than 80° C. while adding portionwise a metal hydroxide to the reaction mixture to maintain the pH of the reaction mixture between 7.0 and 11.5 until the crossed Cannizzaro reaction is substantially completed.

---

This is a continuation-in-part of copending application Ser. No. 409,606, filed on Nov. 6, 1964, and now abandoned.

The present invention relates to a process for producing 2,2-dimethyl-1,3-propanediol. More particularly, it relates to a process for producing 2,2-dimethyl-1,3-propanediol from isobutyraldehyde and formaldehyde which comprises first maintaining the pH of a reaction mixture at a value of 7.0 to 11.5 and the temperature thereof at 10° to 50° C. to effect selectively aldol condensation and then effecting crossed Cannizzaro reaction at a temperature higher than 50° C. and lower than 80° C. while adding portionwise a metal hydroxide to the reaction mixture so as to maintain the pH of the reaction mixture at a value of 7.0 to 11.5 until the crossed-Cannizzaro reaction between oxypivalaldehyde (2,2-dimethyl-3-oxypropanol-(1)) which is an intermediate and formaldehyde is substantially completed.

The term "metal hydroxide" used herein refers to lithium hydroxide, sodium hydroxide, potassium hydroxide, calcium hydroxide, barium hydroxide, thallium hydroxide, etc.

An object of the present invention is to produce 2,2-dimethyl-1,3-propanediol of a high quality and a high purity in good yield by inhibiting the formation of by-products which are difficult to separate even by rectification.

Relatively few reports have been found concerning the production of 2,2-dimethyl-1,3-propanediol. Theoretically, two moles of formaldehyde and an equivalent of a strong base are required for one mole of isobutyraldehyde, and in the second step, one mole of formate is formed by crossed Cannizzaro reaction. When isobutyraldehyde reacts with formaldehyde in the presence of a strong base, such as sodium hydroxide, potassium hydroxide, calcium hydroxide and the like, the main reaction produces 2,2-dimethyl-1,3-propanediol through oxypivalaldehyde while various by-products are formed. Joseph Frederic Walker et al. disclose in U.S. Patent No. 2,135,063 that the highest yield (75.5%) is attained by effecting reaction at a temperature of 5° to 50° C. while controlling the amount of water employed in the reaction mixture within the range of 20 to 60%, particularly 35 to 50% of the total weight of the reaction mixture. Further, Francis L. Meinhofer discloses in U.S. Patent No. 2,778,858 that when reaction is completed in a short time at a temperature of 60° to 80° C., the yield reaches the maximum (yield: 92.3%, purity: 99.3% in Example 2). In general, as a method of mixing the starting materials there has often been adopted a method of adding a metal hydroxide to mixed aldehydes. However, Joseph A. Wyler proposes in U.S. Patent No. 2,786,083 a method of simultaneously adding isobutyraldehyde and metal hydroxide to an aqueous formaldehyde solution in order to prevent the isobutyraldehyde and the metal hydroxide from being reacted to form isobutyrate and hydrogen. That is to say, a lime slurry consisting of 112 parts of calcium hydroxide and 290 parts of water is added to 1241.3 parts of a 10% aqueous formaldehyde solution so as to maintain the pH at 7–13. A few minutes after the starting of the addition of said lime slurry, 144.12 parts of 99.54% isobutyraldehyde is simultaneously added dropwise to said formaldehyde solution. The reaction temperature is maintained at 30° C. and the addition rate of said isobutyraldehyde is adjusted so that the amount of unreacted isobutyraldehyde does not exceed 1% by weight (0.15% of the weight of the reaction mixture, the analysis being made by a polarograph technique). The addition time of calcium hydroxide is 90 minutes and that of isobutyraldehyde is 120 minutes. After the completion of the addition, stirring is continued at 30° C. until the aldehyde content becomes 0.23% by weight. After the completion of the reaction, the reaction product is neutralized with sulfuric acid, the precipitated calcium sulfate is filtered off and then the filtrate is subjected to extraction with an ether or acetone. The solvent is distilled off from the extract to obtain 2,2-dimethyl-1,3-propanediol (yield: 94%) of a hydroxide content of 32.26% (theory: 32.66%, purity: 98.8%).

When isobutyraldehyde is reacted with formaldehyde in the presence of a strong base, such as sodium hydroxide, 2,2-dimethyl-1,3-propanediol is formed through oxypivalaldehyde in the main reaction and simultaneously isobutylaldoxane is formed as the by-product. It is known that isobutylaldoxane is decomposed into isobutyraldehyde and isobutylaldol on acidifying the reaction mixture (U.S. Patent No. 2,829,169). Further, when isobutylaldol is subjected to cross Cannizzaro reaction, 2,2,4-trimethyl-1,3-pentanediol is formed.

The separation of isobutylaldol and 2,2,4-trimethyl-1,3-pentanediol from 2,2-dimethyl-1,3-propanediol which is the product of the present process is very difficult by a conventional distillation method, because the boiling points of the three are very close as shown in Table 1.

TABLE 1

| Compound | Boiling point (° C./mm.Hg) | Melting point (° C.) |
| --- | --- | --- |
| 2,2-dimethyl-1,3-propanediol | 125–130/15 | 129–130 |
| 2,2,4-trimethyl-1,3-pentanediol | 122–126/15 | 51.5 |
| Isobutylaldol | 122–125/15 | |

Although an attempt has been made to extract off the by-products utilizing the difference in melting points, no solvent has been found suitable for said purpose. Isobutylaldoxane which is a cause of the formation of isobutyraldehyde and 2,2,4-trimethyl-1,3-pentanediol is relatively unstable to heating and decomposed into the starting isobutyraldehyde at 60° C. or more (U.S. Patent No. 2,829,169). Therefore, it is considered that in the reaction of isobutyraldehyde with formaldehyde, the formation of isobutylaldoxane can be avoided by effecting the aldol condensation at a temperature of 60° to 90° C. In fact, this idea is the same as the principle of the above-mentioned Meinhofer process.

The aldol condensation of isobutyraldehyde with formaldehyde at a temperature higher than 60° C. causes various problems due to high temperature reaction, though the formation of isobutylaldoxane is inhibited to some extent. That is to say, a Cannizzaro reaction of isobutyraldehyde is caused simultaneously with the aldol condensation of isobutyraldehyde with formaldehyde to produce isobutanol and isobutyric acid and also produce a considerable amount of isobutylaldoxane, very easily colorable compounds, the molecular structure of which is unknown, and compounds having higher boiling points than that of 2,2-dimethyl-1,3-propanediol.

When the aldol condensation and the crossed Cannizzaro reaction are substantially simultaneously effected at a temperature lower than 50° C. as in the Walker and Wyler methods mentioned above, the kind of by-products is varied depending upon the pH of the reaction mixture and the yield also varies very greatly. Moreover, at a temperature lower than 50° C., the amount of oxypivalic acid (2,2-dimethyl-3-oxypropanoic acid) produced is increased, and hence it is impossible to produce highly pure 2,2-dimethyl-1,3-propanediol in a good yield.

In the production of 2,2-dimethyl-1,3-propanediol from isobutyraldehyde and formaldehyde, in general, many by-products are produced, and most of them are thermally unstable and become yellowish orange or reddish black upon heating. Said by-products are very difficult to separate from the desired product, and the product obtained by subjecting the reaction product of said method to careful distillation has a lower boiling point, such as 110° to 120° C. and is light yellow or becomes yellowish red upon heating with a carboxylic acid, such as phthalic anhydride. Accordingly, in order to obtain a highly pure, highly heat-stable 2,2-dimethyl-1,3-propanediol (boiling point: 128–130° C.) which is suitable for the production of synthetic fibers and polyester films, recrystallization, treatment with activated carbon and rectification must be repeated several times.

The present inventors have done extensive research on the production of 2,2-dimethyl-1,3-propanediol and found that the reaction conditions proposed in the prior art, for example, in the above-mentioned U.S. patents are not essential or critical. As mentioned above, Wyler discloses that in order to prevent the reaction between isobutyraldehyde and a metal hydroxide, such as sodium hydroxide, to form isobutyric acid and hydrogen, the addition rate of isobutyraldehyde must be adjusted so that the amount of unreacted isobutyraldehyde in the reaction mixture does not exceed 1% by weight based on the weight of unreacted formaldehyde. However, according to the present inventors' experiment, the generation of hydrogen has not been confirmed at a reaction temperature below 50° C., and substantially no effect of the method of adding isobutyraldehyde on the yield of the product and the quality of the product has been confirmed. This seems to be because such reaction conditions are not proposed based on the most fundamental properties of various reactions which may be caused in the present synthetic reaction, that is, kinetic properties.

In order to solve said problems at one time and establish a method which can most easily be carried out in industry, the present inventors have made various fundamental experiments. The results of the experiments are explained hereinafter, referring to the drawings, in which:

FIG. 3 is a graph showing the relation between the reaction temperature and the reaction velocity constant ratio, $k_2/k_3$, in which $k_2$ is the crossed Cannizzaro reaction velocity constant between oxypivalaldehyde and formaldehyde and $k_3$ is the Cannizzaro reaction velocity constant between the molecules of oxypivalaldehyde;

Figure 5:
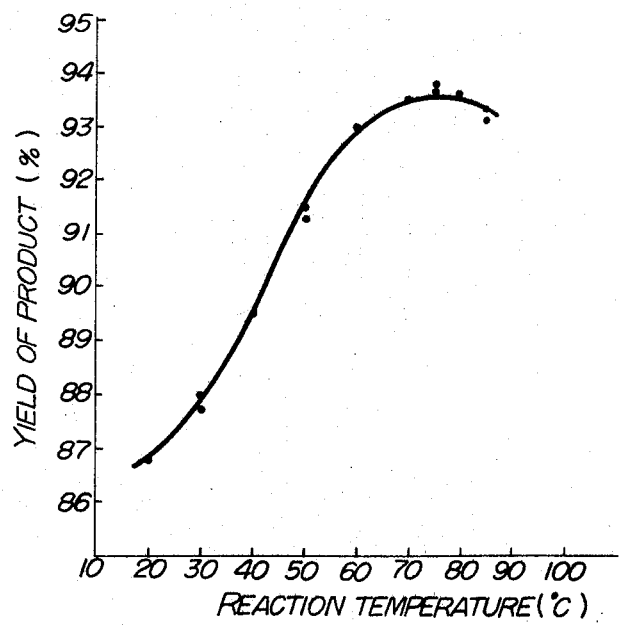
Figure 4:
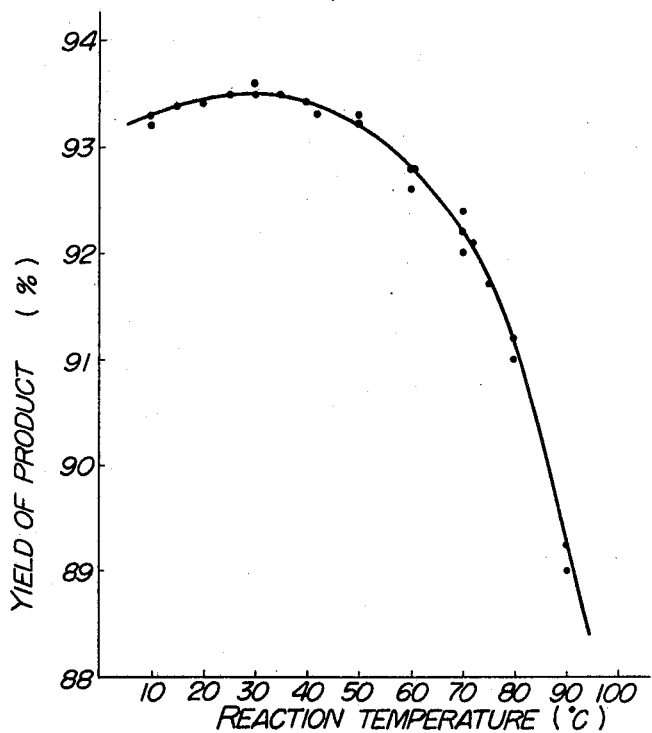

FIG. 4 is a graph showing the relation between the aldol condensation reaction temperature and the yield of product obtained by effecting the aldol condensation reaction at a molar ratio of isobutyraldehyde: formaldehyde: sodium hydroxide = 1.0:2.1:1.03 while maintaining the pH of the reaction mixture between 10.7 and 10.9 at various temperatures (at 10° C. for 30 min. and at 15° C. for 45 min.), in which the operation and the crossed Cannizzaro reaction conditions are the same as in Example 6 which is disclosed hereinafter; and FIG. 5 is a graph showing the relation between the crossed Cannizzaro reaction temperature and the yield of product obtained according to the method of Example 6.

Figure 1:
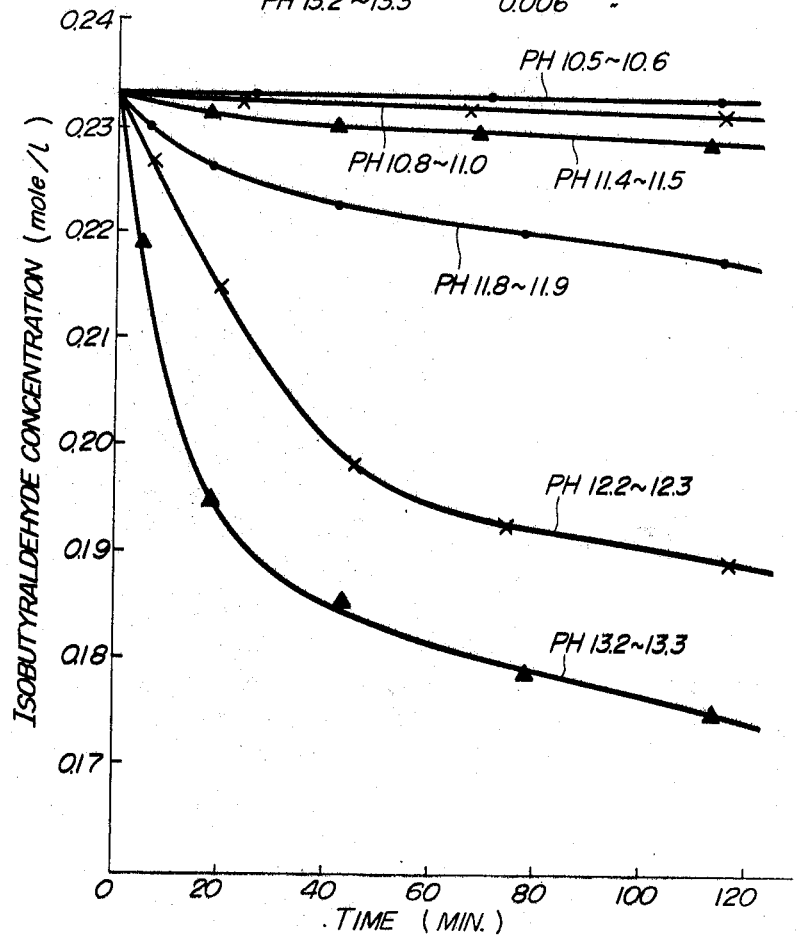
FIG. 1 is a graph showing the relation between the pH of aqueous isobutyraldehyde solution and the change of isobutyraldehyde concentration with the lapse of time as measured at 20° C.
Figure 2:
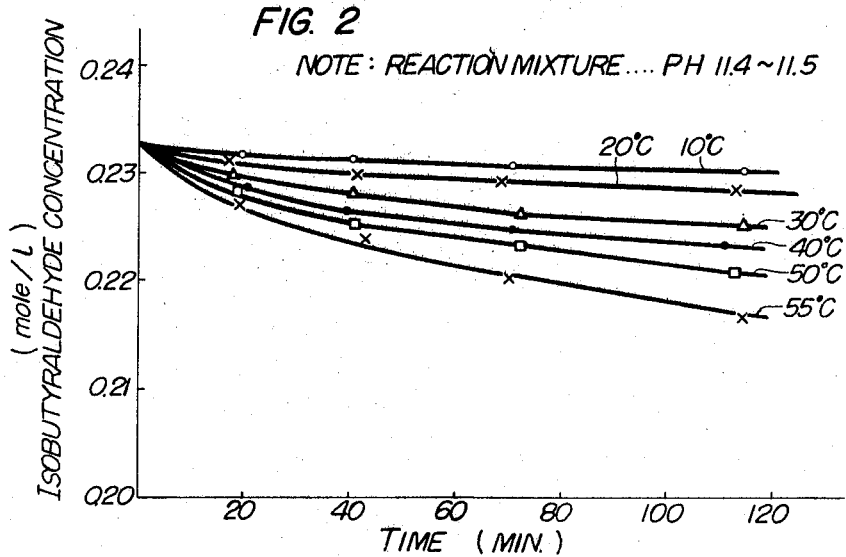
FIG. 2 is a graph showing the relation between the temperature and the change of isobutyraldehyde concentration with the lapse of time at a pH of the aqueous isobutyraldehyde solution of 11.4 to 11.5.

The results of experiment concerning the formation of isobutylaldoxane are shown in FIGS. 1 and 2. As shown in FIG. 1, when the pH of an aqueous isobutyraldehyde solution exceeds 11.5, the rate of reduction of isobutyraldehyde concentration, in other words, isobutyraldehyde condensation velocity, is rapidly enhanced. However, as shown in FIG. 2, the condensation velocity increases with the elevation of reaction temperature is low as compared with the effect of the pH of the aqueous isobutyraldehyde solution. That is, it is understood from FIGS. 1 and 2 that the condensation between the molecules of isobutyraldehyde, mainly the formation of isobutylaldoxane, which directly affects the yield and purity of the desired product, can substantially be prevented or inhibited by maintaining the reaction mixture at a pH below 11.5 and at a temperature lower than 50° C. On the other hand, according to the result of kinetic analysis of aldol condensation of isobutyraldehyde with formaldehyde, the velocity of said aldol condensation, $V_1$, is not proportional to the molar concentration of the metal hydroxide in the reaction mixture but to the hydroxide ion concentration, [OH$^-$], in other words, the pH, which is shown by the following equation:

(1) $V_1 = k_1[(CH_3)_2 \cdot CH \cdot CHO] \cdot [H \cdot CHO] \cdot [OH^-]$ wherein $k_1$ is a reaction velocity constant. The fact that the velocity of said aldol condensation is proportional to the pH of the reaction mixture means that the control of reaction can be effected with the pH of the reaction mixture. This is a very important knowledge in view of the fact that as shown in FIG. 1, the aldol condensation between the molecules of isobutyraldehyde is extremely accelerated at a high pH value, particularly above 11.5.

The velocity of the crossed Cannizzaro reaction of formaldehyde with the oxypivalaldehyde (2,2-dimethyl-3-oxypropanal-(1)) produced by the aldol condensation of isobutyraldehyde with formaldehyde, $V_2$, is proportional to the molar concentration of the metal hydroxide, which is shown by the following equation:

(2) $V_2 = k_2[HOCH_2 \cdot C(CH_3)_2 \cdot CHO]^{2/3} \cdot [H \cdot CHO]^{1/2} \cdot [M \cdot OH]^{2/3}$ wherein $k_2$ is a reaction velocity constant and M is a metal. Similarly, the velocity of the Cannizzaro reaction between the molecules of oxypivalaldehyde which is a side reaction, $V_3$, is shown by the following equation:

(3) $V_3 = k_3[HOCH_2 \cdot C(CH_3)_2 \cdot CHO] \cdot [M \cdot OH]^{2/3}$ wherein $k_3$ is a reaction velocity constant. The main side reaction of oxypivalaldehyde is the Cannizzaro reaction between the molecules thereof. The reaction velocity Equations 2 and 3 teach that the ratio of the velocity of formation of 2,2-dimethyl-1,3-propanediol to the velocity of formation of oxypivalic acid is proportional to the reaction velocity constant ratio, $k_2/k_3$. The relation between the reaction velocity constant ratio and the reaction temperature is as shown in FIG. 3. It is clear from FIG. 3 that the higher the reaction temperature, the less the Cannizzaro reaction between the molecules of oxypivalaldehyde, and the higher the yield of the desired product. In other words, in the crossed Cannizzaro reaction between oxypivalaldehyde and formaldehyde, the amount of oxypivalic acid produced as by-product is decreased with the elevation of reaction temperature. More specifically speaking, referring, for instance, to a reaction temperature of 30° C., the amount of oxypivalic acid produced is about 9 mole percent based on the starting isobutyraldehyde, whereas at a reaction temperature of 80° C., the amount is about 4 mole percent based on the same. Thus, by elevating the temperature for crossed Cannizzaro reaction from 30° to 80° C., the amount of oxypivalic acid produced as by-product can be reduced to ½ or less.

As already mentioned in detail, the optimum conditions for the aldol condensation of isobutyraldehyde with formaldehyde are quite different from those for the crossed Cannizzaro reaction. The present inventors have done research on the reaction mechanism between isobutyraldehyde and formaldehyde and consequently found that by effecting the aldol condensation and the crossed Cannizzaro reaction in separate steps, i.e. two independent steps under the respective optimum conditions, side reactions which adversely affect the purity of the final product can be inhibited.

According to the present invention, 2,2-dimethyl-1,3-propanediol is produced from isobutyraldehyde and formaldehyde by first selectively effecting aldol condensation reaction at a pH of the reaction mixture maintained within the range of 7.0 to 11.5 and at a temperature of 10° to 50° C. and then effecting crossed Cannizzaro reaction between formaldehyde and oxypivalaldehyde, which is an intermediate, at a temperature higher than 50° and lower than 80° C. while adding metal hydroxide for the Cannizzaro reaction to the reaction mixture so as to maintain the pH of the reaction mixture within the range of 7.0 to 11.5 until said crossed Cannizzaro reaction is substantially completed.

In order to clarify and specifically explain the advantages obtained by effecting said reaction under the above-mentioned new conditions, the following experimental example is illustrated: The desired product was extracted with methylene chloride from the reaction product obtained by the method of Example 1 which is shown hereinafter. The solvent was recovered from the resulting extract and the remainder was subjected to rectification under reduced pressure to obtain the product. The relation between the pH of the reaction mixture in the aldol condensation and the melting point, the melt color number of said product and the resin color number of the unsaturated polyester resin obtained by reacting 1.05 moles of said product (2,2-dimethyl-1,3-propanediol) with 0.5 mole of phthalic anhydride and 0.5 mole of maleic anhydride at a temperature of 200° to 230° C. for 5 hours are as shown in Table 2, in which the melt color number refers to the hue of the desired product in a molten state and the resin color number indicates the thermal stability of the desired product.

TABLE 2

| Experiment No. | pH value | Melting point (° C.) | Melt color number (APHA) | Resin color number (APHA) |
|---|---|---|---|---|
| 1 | 13.4–13.6 | 111–113 | 30–40 | 200–300 |
| 2 | 12.0–12.2 | 113–115 | 10–20 | 80–100 |
| 3 | 11.2–11.4 | 126–128 | Below 10 | 20–30 |
| 4 | 10.9–11.1 | 128–129.5 | Below 10 | 20–25 |
| 5 | 10.6–10.8 | 129–130 | Below 10 | 20–25 |

Table 2 clearly shows that by adjusting the pH of the reaction mixture to 11.5 or less in the aldol condensation, the side reaction which is a cause of the reduction of the purity of product can be substantially inhibited, whereby coloring materials which are difficult to separate even by rectification and thermally unstable and easily colorable by-products (molecular structure is unknown) can be prevented from being formed. Furthermore, the relation between the aldol condensation reaction temperature and the yield of product is obtained according to the method of Example 6 which is disclosed hereinafter. The results are shown in FIG. 4. Furthermore, the relation between the crossed Cannizzaro reaction temperature and the yield of product is obtained according to the method of Example 6 which is disclosed hereinafter. The results are as shown in FIG. 5. FIGS. 4 and 5 prove that the crossed Cannizzaro reaction between oxypivalaldehyde and formaldehyde is preferably higher in theory and in practice than the aldol condensation temperature, particularly from 50° to 80° C., and the reaction at a temperature lower than 50° C. must particularly be avoided. In theory, the higher the crossed Cannizzaro reaction, the better because the reaction velocity constant ratio, $k_2/k_3$, is increased. However, in practice, above 70° C., the yield is almost constant as seen from FIG. 5. The reason therefor will be that at such high temperatures, new different side reactions are caused to consume the formed desired 2,2-dimethyl-1,3-propanediol or the intermediately formed oxypivalaldehyde. At a crossed Cannizzaro reaction temperature above 80° C., particularly above 85° C., the yield is slightly reduced and the degree of color of the reaction mixture is very high. The color is reddish black and such colored materials are difficult to separate by rectification. Further, high-boiling compounds having unknown molecular structures are increasingly produced.

It is believed that those skilled in the art will fully understand that the conditions used in the present invention are very critical.

In the present process, the amount of metal hydroxide required to synthesize one mole of 2,2-dimethyl-1,3-propanediol is one equivalent. For example, the amount is one mole for sodium hydroxide and 0.5 mole for calcium hydroxide. In the aldol condensation reaction, the metal ion formed by dissociation of the metal hydroxide is not consumed and the formed hydroxide ion acts as a catalyst, and the selectivity of reaction is determined by the pH of the reaction mixture. Therefore, in the aldol condensation step, the metal hydroxide should be added in an amount only sufficient to maintain the pH of the reaction mixture within the range of 7.0 to 11.5, preferably within the range of 10.5 to 11.0 to maintain the pH substantially constant during the reaction. The reaction temperature is from 10° to 50° C., and preferably from 25° to 35° C. The reaction under such conditions enables isobutyraldehyde to be selectively converted into oxypivalaldehyde. However, the time required for the aldol condensation reaction is usually 5 to 90 minutes. The amount of metal hydroxide added as a catalyst in the aldol condensation reaction is varied depending upon the amount of formic acid contained in the starting formaldehyde solution, the amount of isobutyric acid contained in the starting isobutyraldehyde and the reaction temperature. However, when an aqueous formaldehyde solution containing up to 300 p.p.m. of formic acid and a purified isobutyraldehyde stored under a nitrogen gas seal are used and the reaction temperature is from 25° to 35° C., the amount of the metal hydroxide is about 0.001 to 0.01 mole per mole of the starting isobutyraldehyde. When the aldol condensation reaction is completed, a metal hydroxide is added in an amount substantially equimolar to the formed oxypivalaldehyde to effect the crossed Cannizzario reaction.

Since according to the present process, the starting isobutyraldehyde is substantially stoichiometrically converted into oxypivalaldehyde in the aldol condensation step, the amount of a metal hydroxide to be added in the crossed Cannizzario reaction may be about equimolar to the starting isobutyraldehyde. When the crossed Cannizzaro reaction is effected at a temperature higher than 50° C. and lower than 80° C., preferably 65° to 75° C., a metal hydroxide for said crossed Cannizzaro reaction should portionwise be added so as to maintain the pH of the reaction mixture within the range of 7.0 to 11.5 until the reaction between the oxypivalaldehyde intermediate and formaldehyde is substantially completed, whereby various side reactions can be prevented or inhibited.

The present process may be carried out either in batch or continuous system. In the case of batch system, the desired pH of the reaction mixture can be maintained by dropping the necessary amount of metal hydroxide in the form of an aqueous solution or slurry in a period of 20 to 90 minutes, preferably 30 to 60 minutes at a constant rate into the reaction mixture, whereby the desired product is obtained in the best yield. When the reaction is effected in continuous system, the metal hydroxide should be charged into a vessel from two or more places (the more the better) so that the addition rate of the metal hydroxide is substantially the same as the consumption rate of the metal hydroxide.

The necessary amount of formaldehyde may be charged into a reaction vessel at one time at the beginning or may portionwise be added so that the molar ratio of the starting materials in the aldol condensation reaction is 1.0 to 1.2 moles per mole of isobutyraldehyde in order to prevent the formation of derivatives of 2,2-dimethyl-1,3-propanediol, such as hemiacetal and formal. However, the present inventors' experiment clarifies that the effect of a method of adding formaldehyde on the yield and quality of the product is negligible. Similarly, substantially no effect of a method of adding isobutyraldehyde is found. That is to say, no trouble has been observed or experienced by charging the necessary amounts of isobutyraldehyde and formaldehyde (2.0 to 2.3 moles per mole of isobutyraldehyde) into a vessel before the beginning of aldol condensation reaction, then adding a metal hydroxide thereto to maintain the pH of the mixture within the range of 7.0 to 11.5, preferably 10.5 to 11.0, effecting the aldol condensation at a temperature of 10° to 50° C., preferably 25° to 35° C. for a period of 5 to 90 minutes, generally 15 to 45 minutes within said pH range, thereafter elevating the temperature of the reaction mixture to 50–80° C., preferably 65–75° C. in about 10 minutes the more rapid the better) with or without adding a metal hydroxide and effecting the crossed Cannizzaro reaction within said temperature range. In other words, in the present process, any method of adding isobutyraldehyde and formaldehyde may be added to always obtain the best result. This is very important in particular in a continuous system operation.

According to the present process, the amounts of isobutylaldoxane, oxypivalic acid, colored materials and high boiling compounds produced as by-products are very small as compared with those in conventional processes, the control of the reaction conditions is very easy, and thermally stable 2,2-dimethyl-1,3-propanediol of a high quality is produced in good yield by subjecting the reaction product to only one rectification or recrystallization.

The present invention is further explained by the following examples by way of illustration and not by way of limitation.

Example 1

Into a reaction vessel provided with a stirring means, a thermometer, a pH meter electrode and two dropping funnels for sodium hydroxide and isobutyraldehyde was charged 6.6 moles of formalin (40 percent of formaldehyde, 1 percent of methanol and 25 p.p.m. of formic acid). One of the dropping funnels was filled with a 30 percent aqueous sodium hydroxide (3.03 moles) solution, and the other with 3.0 moles of 98 percent isobutyraldehyde. After adjusting the pH of the reaction mixture to 11.0 by dropping a small amount of the aqueous sodium hydroxide solution into the vessel, the isobutyraldehyde was dropped into the vessel in 40 minutes while maintaining the reaction temperature between 25° C. and 30° C. to effect the aldol condensation reaction. During this stage, the pH of the reaction mixture was controlled within the range of 10.9 to 11.1. The amount of sodium hydroxide added in the aldol condensation reaction was about 0.01 mole. After the addition of isobutyraldehyde was completed, the stirring of the mixture was continued for an additional 20 minutes and then an aqueous sodium hydroxide solution for the crossed Cannizzaro reaction was added while elevating the temperature to 50–55° C. The reaction mixture was maintained at a temperature of 50° to 55° C. for 30 minutes to effect the crossed Cannizzaro reaction, and the mixture was then neutralized with formic acid to a pH of 6.0 to 6.5 to complete the crossed Cannizzaro reaction.

The reaction product was extracted with methylene chloride from the reaction solution, the solvent was recovered and then the product was subjected to rectification under reduced pressure to obtain 275 g. of 2,2-dimethyl-1,3-propanediol having a melting point of 128.5° to 129° C. This yield corresponds to 88 percent of the theoretical value.

The thus obtained 2,2-dimethyl-1,3-propanediol (1.05 moles) was reacted with 0.5 mole of phthalic anhydride and 0.5 mole of maleic anhydride at a temperature of 200° C. to 230° C. for 5 hours to obtain an unsaturated polyester resin. The APHA color number of the thus obtained resin was 20 to 25.

Example 2

Aldol condensation reaction, subsequent crossed Cannizzaro reaction and after-treatment were effected in the same manner as in Example 1, except that the pH of the reaction mixture in the aldol condensation reaction was controlled within the range of 10.6 to 10.8, whereby 280 g. (yield: 89.5%) of 2(2-dimethyl-1,3-propanediol having a melting point of 129° to 130° C. was obtained.

The thus obtained 2,2-dimethyl-1,3-propanediol (1.05 moles) was reacted with 0.5 mole of phthalic anhydride and 0.5 mole of maleic anhydride at a temperature of 200° to 230° C. for 5 hours to obtain an unsaturated polyester resin. The APHA color number of the thus obtained resin was 20 to 25.

Example 3

In the aldol condensation reaction, 3.6 moles of formaldehyde, 3.0 moles of isobutyraldehyde and a small amount of sodium hydroxide were charged into a reaction vessel, and the aldol condensation was effected in the same manner as in Example 1 while maintaining the pH of the reaction mixture within the range of 10.7 to 10.9. The amount of sodium hydroxide added in the aldol condensation step was about 0.005 mole. An aqueous sodium hydroxide solution (about 3.025 moles) and formaldehyde (3.0 moles) were dropped into the vessel, and the crossed Cannizzaro reaction and after-treatment were carried out in the same manner as in Example 1, whereby 289 g. (yield: 92.5%) of 2,2-dimethyl-1,3-propanediol having a melting point of 129° to 130° C. was obtained.

The thus obtained 2,2-dimethyl-1,3-propanediol (1.05 moles) was reacted with 0.5 mole of phthalic anhydride and 0.5 mole of maleic anhydride at a temperature of 200° to 230° C. for 5 hours to obtain an unsaturated polyester resin. The APHA color number of the thus obtained resin was 20 to 25.

Example 4

Into a reaction vessel provided with a stirring means, a thermometer, a pH meter electrode and a dropping funnel for sodium hydroxide were charged 6.6 moles of Formalin (formaldehyde 42%, methanol 0.5%, formic acid 20 p.p.m.) and 3.0 moles of 98% isobutyraldehyde. The dropping funnel was filled with 3.06 moles of a 48% aqueous sodium hydroxide solution. A mixture of formaldehyde and isobutyraldehyde was first cooled to 20° C. while being violently stirred and the sodium hydroxide solution was then dropped thereinto to adjust the pH of the reaction mixture to a value of 10.7 to 10.9. The aldol condensation was effected for 30 minutes while maintaining the pH of the reaction mixture and the reaction temperature at 10.7–10.9 and at 30–35° C., respectively. The amount of sodium hydroxide added in the aldol condensation step was about 0.005 mole. The temperature of the reaction mixture was elevated to 70° C. in 10 minutes, and then an aqueous sodium hydroxide solution (about 3.055 moles) was dropped thereinto at a constant rate in 45 minutes while maintaining the reaction temperature between 70° C. and 75° C. to effect the crossed Cannizzaro reaction. After the completion of the addition of the aqueous sodium hydroxide solution, the reaction was continued for an additional 15 minutes, and then the reaction mixture was neutralized with formic acid to a pH of 6.0 to 6.5 to complete the reaction.

The reaction product was extracted with methylene chloride from the reaction solution, the solvent was recovered and the product was subjected to rectification under reduced pressure to obtain 294.5 g. (yield: 94.4%) of 2,2-dimethyl-1,3-propanediol having a melting point of 129° to 130° C.

The thus obtained 2,2-dimethyl-1,3-propanediol (1.05 moles) was reacted with 0.5 mole of phthalic anhydride and 0.5 mole of maleic anhydride at a temperature of 200° C. to 230° C. for 5 hours to obtain an unsaturated polyester. The APHA color number of the thus obtained resin was 20 to 25.

The same procedure as above was repeated using potassium hydroxide, calcium hydroxide and barium hydroxide in place of sodium hydroxide to obtain the desired product in substantially the same yield as the case of sodium hydroxide.

Example 5

In the same manner as in Example 4, 3.0 moles of isobutyraldehyde was reacted with 6.6 moles of formaldehyde using 3.42 moles of sodium hydroxide, and the obtained reaction solution was subjected to extraction with methylene chloride. The solvent was recovered from the extract and the product was recrystallized from a solution in 400 cc. of benzene. The crystal was filtered off and dried under reduced pressure, whereby 301 g. (yield: 96.5%) of 2,2-dimethyl-1,3-propanediol having a melting point of 129° to 130° C. was obtained.

The thus obtained 2,2-dimethyl-1,3-propanediol (1.05 moles) was reacted with 0.5 mole of phthalic anhydride and 0.5 mole of maleic anhydride at a temperature of 200° to 230° C. for 5 hours to obtain an unsaturated polyester resin. The APHA color number of thus obtained resin was 50 to 60.

Example 6

Into a reaction vessel provided with a stirrer, a thermometer, a pH meter electrode and a dropping funnel for sodium hydroxide were charged 6.3 moles of Formalin (formaldehyde 42%, methanol 0.5%, formic acid 20 p.p.m.) and 3.0 moles of 98% isobutyraldehyde. The dropping funnel was filled with a 48% aqueous sodium hydroxide solution (3.09 moles). First of all, the mixture of formaldehyde and isobutyraldehyde was cooled to 20° C. while being violently stirred, and then the sodium hydroxide solution was dropped thereinto to adjust the pH of the reaction mixture to 10.7–10.9. The aldol condensation reaction was effected at a temperature of 20° to 25° C. for 30 minutes while maintaining the pH of the reaction mixture within the range of 10.7 to 10.9. The amount of sodium hydroxide added in the aldol condensation step was about 0.005 mole. The reaction mixture was thereafter heated to 70° C. in 10 minutes. An aqueous sodium hydroxide solution (about 3.055 moles) was dropped thereinto at a constant rate in 30 minutes while maintaining the reaction temperature at 70°±1° C. to effect the crossed Cannizzaro reaction. After the completion of the sodium hydroxide addition, the reaction was continued for an additional 30 minutes, after which the reaction mixture was neutralized with formic acid to a pH of 6.0 to 6.5 to complete the reaction.

The reaction solution was subjected to extraction with methyl isobutyl ketone, the solvent was recovered and then rectification under reduced pressure was effected, whereby 292.0 g. (yield: 93.5%) of 2,2-dimethyl-1,3-propanediol having a melting point of 129° to 130° C. was obtained.

The thus obtained 2,2-dimethyl-1,3-propanediol (1.05 moles) was reacted with 0.5 mole of phthalic anhydride and 0.5 mole of maleic anhydride at a temperature of 200° to 230° C. for 5 hours to obtain an unsaturated polyester resin. The APHA color number of the thus obtained resin was 20 to 25.

EXAMPLE 7

Into a 100-1 reaction vessel equipped with a stirrer, a metallic sheathed ceramic insulated resistance bulb for an electronic temperature indicating recorder, an electrode for an electronic pH indicating recorder and a measuring tank for sodium hydroxide were charged 200 moles of isobutyraldehyde (purity: 96%) and 430 moles of Formalin (formaldehyde 42%, methanol 0.5%, formic acid 20 p.p.m.). The measuring tank for sodium hydroxide was filled with a 48% aqueous sodium hydroxide solution (220 moles). The jacket of the reaction vessel was designed so that an aqueous ethylene glycol solution of −5° C. and an aqueous ethylene glycol solution of 80° C. can be recycled separately or in admixture. The solution in the reaction vessel was first cooled to 20° C., and then the aqueous sodium hydroxide solution was added to adjust the pH of the reaction mixture to 10.7 to 10.9. Since the temperature of the reaction solution was elevated simultaneously with the initiation of the reaction, the ethylene glycol solution of −5° C. was passed through the jacket to maintain the reaction temperature between 30° C. and 35° C. The aldol condensation was effected with stirring for 30 minutes while maintaining the pH of the aldol condensation reaction mixture within the range of 10.7 to 10.9. The amount of sodium hydroxide added in the aldol condensation step was about 0.5 mole. The ethylene glycol solution of 80° C. was thereafter passed through the jacket to elevate the temperature of the reaction mixture to 70° C. in 15 minutes, after which the remaining sodium hydroxide (about 219.5 moles) was added thereto at a constant rate in 45 minutes, during which the temperature of the jacket was adjusted so as to maintain the reaction mixture at a temperature of 70° to 75° C. After the completion of the sodium hydroxide addition, the crossed Cannizzaro reaction was continued for an additional 15 minutes, after which the reaction mixture was neutralized with formic acid to a pH of 6.0 to 6.5 to complete the reaction. The reaction product was cooled to room temperature, and then the produced 2,2-dimethyl-1,3-propanediol was extracted off with methyl isobutyl ketone. The solvent was recovered under reduced pressure, and the produced crude crystal was recrystallized from benzene to obtain 19.8 kg. of 2,2-dimethyl-1,3-propanediol having a melting point of 129° to 130° C. This yield corresponds to 95.2% of the theoretical value.

The thus obtained 2,2-dimethyl-1,3-propanediol (1.05 moles) was reacted with 0.5 mole of phthalic anhydride and 0.5 mole of maleic anhydride at a temperature of 200° to 230° C. for 5 hours to obtain an unsaturated polyester resin. The APHA color number of the thus obtained resin was 20 to 25.

A similarly obtained crude crystal was subjected to distillation under a reduced pressure of 70 mm. Hg to obtain 20.1 kg. of 2,2-dimethyl-1,3-propanediol having a melting point of 129° to 130° C. This yield corresponds to 96.6% of the theoretical yield, and an unsaturated polyester resin produced from said 2,2-dimethyl-1,3-propanediol in the same manner as above had an APHA color number of 20 to 25.

We claim:
1. A process for producing 2,2-dimethyl-1,3-propanediol from isobutyraldehyde and formaldehyde, which comprises charging formaldehyde and isobutyraldehyde into a vessel in an initial molar ratio of isobutyraldehyde to formaldehyde of 1:1–1:2, selectively effecting the aldol condensation reaction at a temperature of 25° to 35° C. at a pH of 10.5 to 11.0, further adding formaldehyde to the reaction mixture in an amount larger than the amount corresponding to the theoretical yield of 2,2-dimethyl-1,3-propanediol based on the amount of isobutyraldehyde and effecting the crossed Cannizzaro reaction between the intermediately produced oxypivalaldehyde and formaldehyde at a temperature of 65° C. to 75° C. while adding portionwise a metal hydroxide selected from the group consisting of sodium hydroxide and calcium hydroxide for the crossed Cannizzaro reaction to the reaction mixture to maintain the pH of the reaction mixture between 7.0 and 11.5 until the crossed Cannizzaro reaction is substantially completed.

References Cited
UNITED STATES PATENTS

| | | |
|---|---|---|
| 2,135,063 | 11/1938 | Walker et al. |
| 2,372,602 | 3/1945 | Owens. |
| 2,400,724 | 5/1946 | Walker. |
| 2,778,858 | 1/1957 | Meinhofer. |
| 2,786,083 | 3/1957 | Wyler. |
| 2,811,562 | 10/1957 | Hagemeyer. |
| 2,818,443 | 12/1957 | Robeson. |

FOREIGN PATENTS

| | | |
|---|---|---|
| 904,780 | 8/1962 | Great Britain. |
| 1,413,645 | 8/1965 | France. |

LEON ZITVER, Primary Examiner

JOSEPH E. EVANS, Assistant Examiner

U.S. Cl. X.R.

260—75, 340, 535, 602, 637